United States Patent [19]

Roberts

[11] 4,125,180
[45] Nov. 14, 1978

[54] DISCONNECT MECHANISM FOR COMPRESSOR DRIVE

[75] Inventor: Richard W. Roberts, Lombard, Ill.

[73] Assignee: Borg-Warner Corporation, Chicago, Ill.

[21] Appl. No.: 749,942

[22] Filed: Dec. 13, 1976

[51] Int. Cl.² ............................................. F16D 43/25
[52] U.S. Cl. ................................. 192/82 T; 64/28 R; 192/71; 192/96; 403/28
[58] Field of Search .............. 192/71, 82 T, 96; 64/28 R; 403/28, 32; 337/407, 408, 409

[56] References Cited

U.S. PATENT DOCUMENTS

| 2,509,813 | 5/1950 | Dineen | 192/101 |
| 2,740,388 | 4/1956 | Bennorth | 192/82 T |
| 2,764,025 | 9/1956 | Otto | 337/409 X |
| 2,828,845 | 4/1958 | Thornton | 192/71 X |
| 2,999,970 | 6/1884 | Fenner | 337/407 X |
| 3,106,343 | 10/1963 | Holland | 192/96 X |
| 3,209,993 | 10/1965 | Seifert | 192/82 T |

Primary Examiner—Allan D. Herrmann
Attorney, Agent, or Firm—Thomas B. Hunter

[57] ABSTRACT

An improved disconnect or power stop mechanism adapted for use in a refrigerant compressor drive system. A temperature responsive element triggers a disconnect or declutching action between the driving and driven members if the system should happen to lose its charge of refrigerant or otherwise get into an unsafe, high temperature condition.

7 Claims, 4 Drawing Figures

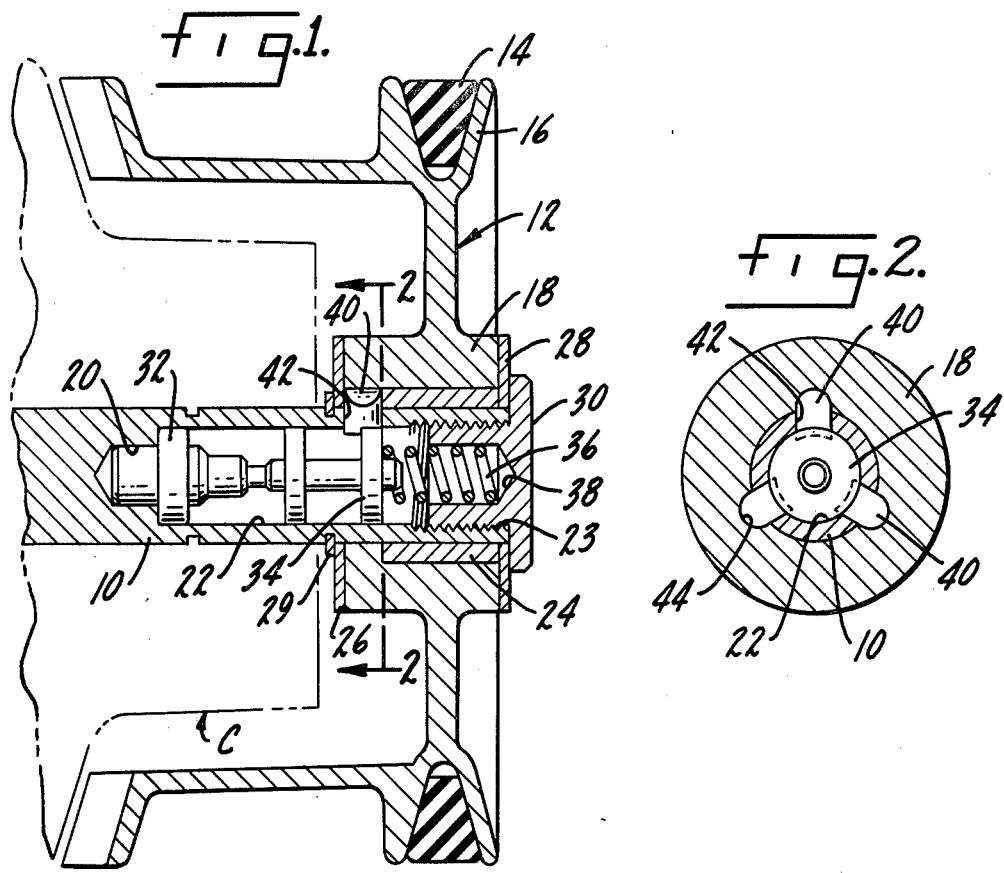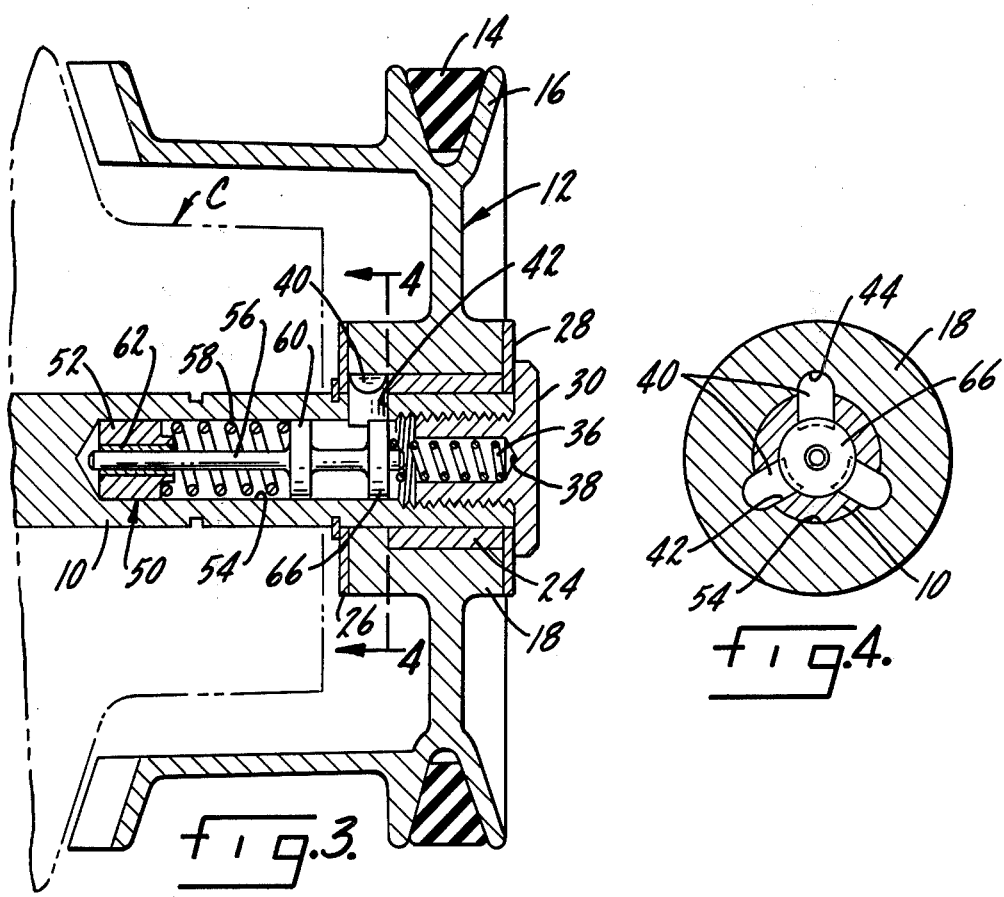

DISCONNECT MECHANISM FOR COMPRESSOR DRIVE

BACKGROUND OF THE INVENTION

1. Field of the Invention

Disconnect or power stop mechanism adapted to de-clutch the driving and driven members of a refrigerant compressor in the event of an unsafe temperature condition, caused, for example, by loss of refrigerant from the system.

2. Summary of the Invention

This invention relates generally to drive means for a refrigerant compressor or the like and more particularly to means for disconnecting the compressor drive shaft from the driving pulley, or other type of drive means, in the event the compressor should become overheated, such as by loss of refrigerant or otherwise.

In the typical air conditioning system designed for use in an automotive application, an electromagnetic clutch is interposed between the drive pulley, which is driven from the automobile engine off one of the accessory drive belts, and the compressor drive shaft. The clutch is actuated and deactuated in response to a signal such as one derived from the air temperature within the automotive passenger compartment, or the fin temperature of the evaporator. This type of system has a number of disadvantages in that when the clutch is engaged it causes immediate drag on the engine which is particularly annoying at idle conditions since it may cause the engine to stall unless the idle is properly adjusted.

One improvement on the clutch actuated system described above is a system in which the capacity of the compressor is modulated from virtually zero to fully capacity over a continuous range of compressor output. In this case, the clutch can be eliminated and the compressor driven at all times while the engine is running.

When the compressor is driven continuously, it can be severely damaged when insufficient lubricant is present in the system or if the system should lose a substantial portion of its refrigerant charge. In the absence of some protective mechanism, the compressor will then overheat, possibly causing seizure of the moving parts.

In the present invention, means are provided for disconnecting or de-clutching the driving and driven members of the compressor if the compressor should reach an unsafe operating temperature. The system is designed so that the compressor may not be repaired on the spot by an inexperienced owner or operator; but will most likely be returned for service by a qualified mechanic who will be able to identify the cause of the overheating condition and reassemble the drive mechanism so that the compressor may be operated safely after the cause of the overheating is remedied.

More specifically, this takes the form of a disconnect mechanism including a temperature responsive actuator which causes a series of drive pins to disengage and permit the drive pulley member to free-wheel on a bearing surface on the shaft.

DESCRIPTION OF THE DRAWINGS

FIG. 1 is a cross section view of a drive pulley and compressor shaft (with the compressor housing shown in outline form) which incorporates the disconnect feature forming the subject of the present invention;

FIG. 2 is a cross sectional view taken along the plane of line 2—2 of FIG. 1;

FIG. 3 is a cross-section view of a modified drive disconnect mechanism; and

FIG. 4 is a cross-section view taken along the plane of line 4—4 of FIG. 3.

DETAILED DESCRIPTION OF A PREFERRED EMBODIMENT

Referring to FIGS. 1 and 2, the compressor housing is shown at C in partial outline form and may actually be any type of apparatus which is driven by a rotary drive shaft 10 connected to the compressing mechanism (not shown). In the context of this invention, the compressor drive shaft 10 will be referred to as the driven shaft since it is an intermediate element in the drive line between the load and the pulley member 12. Pulley member 12 is driven by the automobile engine through one of the accessory V-belts 14. Pulley 12 includes an outer sheave member 16 for reception of the V-belt 14 and an inner hub section 18.

The driven shaft 10 includes a central bore 20 and a counterbore 22 having an internally threaded section at the right-hand end thereof. The hub section 18 of the pully is mounted on a bearing member 24 (e.g. an oil impregnated porous sleeve) which is fitted on the OD of the driven shaft at the free end thereof. The hub is retained axially by a pair of washers 26 and 28, the inner washer 26 being secured by a C-type retaining ring 29 and the outer washer 28 being held in place by a cap member 30 threaded into the shaft end portion 23.

Seated in the bore 20 is a thermal power element 32 of a type familiar to those skilled in the art. These power elements are designed to extend by some predetermined length over a known temperature range. An example of such a mechanism is a Dole power element 31-109 which has a 0.200 in. stroke at 400° F.

The thermal power element 32 abuts an axially extending spool member 34 which is slidable within the counterbore 20 and whose movement is opposed (upon expansion of element 32) by a spring 36 which engages one end of the spool and is seated within a central pocket 38 within the cap member 30. The pulley and the driven shaft are drivingly connected by three radially extending pins 40 which seat on the edge of the spool 34 and extend through corresponding openings 42 in the driven shaft. The radially outermost portion of each pin, machined with a semi-cylindrical surface, is adapted to seat in a complementary pocket 44 (see FIG. 2) in the hub member 18.

It can be seen that when all elements are in the running position shown in FIG. 1, drive is transmitted from the pulley 12 through three pins 40 to the driven shaft 10. Upon reaching some predetermined temperature, such as, for example, about 400° F. (or any other temperature would clearly indicate an unsafe operating condition), the thermal power element 32 expands, forcing the spool to the right. When the spool member clears the outward edge of the pins, they will move inwardly out of pockets 44 and permit the pulley to free-wheel on the bearing 24 surrounding the end portion of the driven shaft. When this occurs, the compressor will immediately stop; and it would be impossible to restart the compressor without disassembling the pulley and drive mechanism.

In the modified apparatus shown in FIGS. 3 and 4, identical reference numerals are used for equivalent components. The basic elements of the mechanism are the same, such as the manner of mounting the drive pulley 12 on the shaft. The major difference resides in the actuating means for disconnecting the drive.

Instead of the thermal power element, the FIG. 3 and 4 embodiment employs a plunger assembly 50 including a plug 52 adapted to be received in bore 54, a rod 56 extending axially through the plug and a strong spring 58, under compression, between plug 52 and an annular guide flange 60 integral with the rod. The rod is preferably soldered to the plug at 62 using a solder which will melt at the desired disconnect temperature (around 400° F.). When the solder melts, the spring 58 (which is more powerful than weak spring 36) will urge the rod to the right (as viewed in FIG. 3) moving spool 66 from underneath the three pins 40 which form the drive connection between the hub 18 and the driven shaft 10. The pins will then drop inwardly and release the pulley from the shaft.

While this invention has been described in connection with certain specific embodiments thereof, it is to be understood that this is by way of illustration and not by way of limitation; and the scope of the appended claims should be construed as broadly as the prior art will permit.

What is claimed is:

1. A disconnect mechanism for interrupting drive from a rotary driving member to a rotary driven member, said mechanism comprising: a hub associated with said driving member; a shaft associated with said driven member; a bearing means supporting said hub on the O.D. of said shaft, at least one pin member capable of assuming a first position in which is is interengaged with both said shaft and said hub to form a driving connection therebetween and a second position in which said pin member is out of engagement with either said hub or said shaft; pin member support means for supporting said pin member in said first position; and temperature responsive means adapted to urge said pin member support out of position causing said pin member to assume irreversibly said second position whereby said hub is permitted to freely rotate on said bearing means.

2. Apparatus as defined in claim 1 wherein said temperature responsive means comprises a thermal power element capable of expanding some predetermined length over a predetermined temperature range, said power element engaging said pin member support and urging the same out of contact with said pin member.

3. Apparatus as defined in claim 1 wherein said temperature responsive means comprises a plunger assembly including first and second members which are bonded together by a material which will unbond at some predetermined temperature, spring means biasing one of said first and second members in a direction which will effect movement of said pin support means at the moment said first and second members become unbonded.

4. A disconnect mechanism for interrupting drive from a rotary driving member to a rotary driven member, said mechanism comprising: a pulley member having a peripheral sheave portion for engagement with a V-belt driving member and a hub having a central bore extending therethrough; a shaft having an axially extending blind bore extending therethrough forming an annular sleeve portion and a plurality of spaced radial apertures formed in said sleeve portion; bearing means interposed between said hub and the outside diameter of said shaft; means defining a plurality of pockets in said hub; a plurality of pins extending through said apertures in said shaft into said pockets thereby forming a driving connection between said hub and said shaft; pin support means received in said axial shaft bore for supporting the radially innermost portion of said pins and holding them in position such that they extend through said shaft apertures into said pockets; temperature responsive means adapted to engage said pin support means and, upon reaching a predetermined temperature level, to force irreversibly said pin support means out of contact with said pins thereby allowing said pins to withdraw from said pockets and release the driving connection between said hub and said shaft and permitting said pulley to rotate freely on said bearing means.

5. Apparatus ad defined in claim 4 including spring means providing a force in opposition to movement of said temperature responsive means.

6. Apparatus as defined in claim 4 wherein said temperature responsive means comprises a thermal power element capable of expanding some predetermined length over a predetermined temperature range, said power element engaging said pin support means and urging the same out of contact with said pin member.

7. Apparatus as defined in claim 4 wherein said temperature responsive means comprises a plunger assembly including first and second members which are bonded together by a material which will unbond at some predetermined temperature, spring means biasing one of said first and second members in a direction which will effect movement of said pin support means at the moment said first and second members become unbonded.

* * * * *